(12) United States Patent
Tseng et al.

(10) Patent No.: US 8,578,326 B2
(45) Date of Patent: Nov. 5, 2013

(54) LOCALIZED INFORMATION-PRESERVING LEVELS IN MODEL VISUALIZATION

(75) Inventors: Patrick S. Tseng, Kirkland, WA (US); Durham Goode, Bellevue, WA (US); John Joseph Jordan, Kirkland, WA (US); Bernie Tschirren, Kirkland, WA (US); Arun Abraham, Redmond, WA (US); Abhishek Shah, Redmond, WA (US); Andrew Jude Byrne, Redmond, WA (US); Suhail Dutta, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1196 days.

(21) Appl. No.: 12/474,193

(22) Filed: May 28, 2009

(65) Prior Publication Data

US 2010/0251187 A1    Sep. 30, 2010

Related U.S. Application Data

(63) Continuation-in-part of application No. 12/411,399, filed on Mar. 26, 2009.

(60) Provisional application No. 61/168,503, filed on Apr. 10, 2009.

(51) Int. Cl.
*G06F 9/44* (2006.01)

(52) U.S. Cl.
USPC ........... 717/105; 717/104; 717/108; 717/113; 717/116; 717/117

(58) Field of Classification Search
USPC .......... 710/105, 104; 717/105, 104, 108, 113, 717/116, 117
See application file for complete search history.

(56) References Cited

U.S. PATENT DOCUMENTS

| 5,801,688 | A | 9/1998 | Mead et al. |
| 6,052,455 | A * | 4/2000 | James ..................... 379/201.03 |
| 6,260,186 | B1 * | 7/2001 | James ........................... 717/104 |
| 6,628,312 | B1 | 9/2003 | Rao et al. |
| 7,099,809 | B2 * | 8/2006 | Dori ................................ 703/6 |
| 7,139,764 | B2 | 11/2006 | Lee |
| 7,174,536 | B1 | 2/2007 | Kothari et al. |
| 7,188,332 | B2 * | 3/2007 | Charisius et al. ............ 717/104 |
| 7,458,027 | B2 | 11/2008 | Dieberger et al. |
| 7,463,263 | B2 | 12/2008 | Gilboa |

(Continued)

OTHER PUBLICATIONS http://techpubs.borland.com/together/tcc62/en/userGuide.pdf.*

(Continued)

*Primary Examiner* — Idriss N Alrobaye
*Assistant Examiner* — Getente A Yimer
(74) *Attorney, Agent, or Firm* — Ogilvie Law Firm

(57) ABSTRACT

Local areas of a visualized modeling language diagram are viewable at different levels of detail without losing information such as model elements and their connectivity. Multiple elements are associated with a group element, which has a visual portion derived from the appearance of a group member element. Connectors between group member elements and non-member elements are suppressed in favor of replacement connectors between the group element and the non-member element(s). The integrity of incoming and outgoing connections to the group is maintained relative to the rest of the model. Ungrouping elements restores the elements to their original state. Grouping can be applied locally to one or more parts of the visual model.

20 Claims, 6 Drawing Sheets

(56) References Cited

U.S. PATENT DOCUMENTS

| | | | |
|---|---|---|---|
| 7,644,432 B2* | 1/2010 | Patrick et al. | 726/1 |
| 7,721,216 B2* | 5/2010 | Zaner et al. | 715/758 |
| 2003/0098880 A1* | 5/2003 | Reddy et al. | 345/763 |
| 2003/0159131 A1* | 8/2003 | Litoiu et al. | 717/120 |
| 2004/0107414 A1* | 6/2004 | Bronicki et al. | 717/105 |
| 2004/0205726 A1* | 10/2004 | Chedgey et al. | 717/125 |
| 2009/0060351 A1* | 3/2009 | Li et al. | 382/224 |
| 2009/0070737 A1* | 3/2009 | Huang et al. | 717/105 |
| 2011/0088011 A1* | 4/2011 | Ouali | 717/105 |

OTHER PUBLICATIONS

O"Go Visual Diagram Editor User Guide Version 1.2" [Online] May 10, 2004, OREAS GMBH, Koln, Germany, XP007900199 Retrieved from the Internet: URL:http://www.oreas.de/.*

Ratprasartporn, Nattakarn, et al., "On Data and Visualization Models for Signaling Pathways", Retrieved at <<http://ieeexplorejeee.org/stamp/stamp.jsp?arnumber=01644307>>, 2006, pp. 10.

Stolte, Chris, et al., "Multiscale Visualization Using Data Cubes", Retrieved at <<window.stanford.edu/projects/polaris/infovis2002.ppt>>, Oct. 2002, pp. 42.

Gotta, Dennis, "Data Visualization", Retrieved at <<http://www.im.ethz.ch/education/FS08/iot_slides/visualization_gotta>>, Apr. 2008, pp. 35.

Kassab, R, et al., "A Multi-Level Abstraction Model for Competitive Learning Neural Networks", Retrieved at <<http://www.actapress.com/PaperInfo.aspx?PaperID=32285&reason=500>>, 2008, pp. 1.

Beehler, Jeff, "Jeff Beehler's Blog", Retrieved at <<http://blogs.msdn.com/jeffbe/archive/2008/04/11/april-rosario-ctp-now-available.aspx>>, Apr. 11, 2008, pp. 5.

* cited by examiner

LOCALIZED INFORMATION-PRESERVING LEVELS IN MODEL VISUALIZATION

RELATED APPLICATIONS

The present application claims priority to, and incorporates, U.S. application Ser. No. 12/411,399 filed 26 Mar. 2009, entitled "Generating and Using Code-Based Diagrams", and U.S. provisional application No. 61/168,503 filed 10 Apr. 2009.

BACKGROUND

Modeling languages have been created to express structure, flow, and other information about software, organizations, and other systems which behave (at least in part) according to a set of rules. Modeling languages may be textual, graphical, or both. Textual modeling languages provide standardized keywords, which may have associated parameters, to represent concepts and relationships. Graphical modeling languages provide design diagrams with named symbols to represent concepts, and lines connecting the symbols to represent relationships between the concepts. Graphical modeling languages are sometimes known as visualized modeling languages, and their named symbols are sometimes known as elements.

SUMMARY

Complex visualized modeling languages, such as Unified Modeling Language, provide flexible and detailed design support. However, their complexity also creates challenges, particularly for beginners. One aspect of visualized modeling language complexity is the multitude of visual elements contained in some diagrams.

Some embodiments described herein provide a way to see a diagram at different levels of detail without losing information such as model elements, connectivity of model elements, and relative screen position of visual elements that correspond to model elements. Some embodiments facilitate grouping in a visualized modeling language diagram which contains elements, by using an identification of group member elements, that is, by identifying multiple elements of the diagram to be associated with a group element. Each group member element has a respective visual portion. A visual portion for the group element is selected, such as a variation on one of the group member element's visual portion. Connector(s) between group member element(s) and non-member element(s) of the diagram are suppressed, and corresponding replacement connector(s) are provided to connect the group element and the non-member element(s). Visual portions of the group member elements are removed from display, and the visual portion of the group element is inserted in the display in their place. The integrity of incoming and outgoing connections to the group is maintained relative to the rest of the model. Ungrouping elements restores the elements to their original state. Grouping can be applied locally to one or more parts of the visual model.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
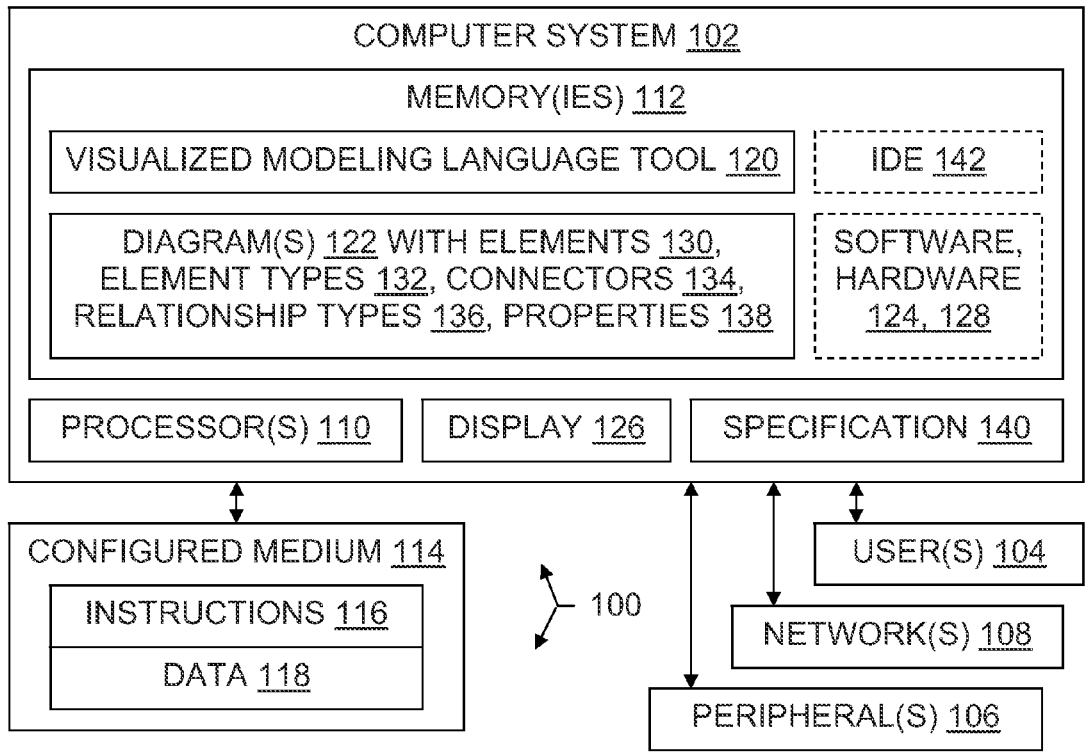
FIG. 1 is a block diagram illustrating a computer system having at least one processor, at least one memory, at least one visualized modeling language tool, and other items in an operating environment which may be present on multiple network nodes, and also illustrating configured storage medium embodiments.

Visual design surfaces of modeling tools can be fluent applications that let a user explore and capture designs quickly, naturally and precisely. Ease of use is often experienced in surfaces that have very simple languages, such as mind mapping applications. However, in more complex languages, such as Unified Modeling Language ("UML"), the large number of visual elements in a design can create confusion and/or distract from the main flow of the design effort (UML specification is promulgated by the Object Management Group, a non-profit computer industry specifications consortium).

To simplify visualization of a model, a set of visual elements can be collectively represented by a smaller set of visual elements while maintaining relational and spatial integrity at the boundaries of this abstraction. One aspect of some embodiments is the re-use of existing visual element types 132 for the purpose of abstraction (in the software engineering sense), that is, grouping/associating elements in a potentially multi-level (nested) manner. Such grouping can be re-applied to other visual elements along with already grouped elements to produce nested, multi-level grouping. The group can be localized instead of forcing a user to apply the same grouping level to all elements of a diagram. Consequently, visual elements can be at different levels of visible detail.

Some embodiments provide one or more of the following features: localizable detail level assignment, multi-level detail level assignment, no loss of information by grouping to form a detail level assignment (level assignment only hides information from view, and a user can dive into a grouping to redisplay details). Visual elements can co-exist on the same diagram surface and still be at different displayed detail levels. Elements grouped to form a level of detail association need not form a complete closure within themselves; visual connectors moving in and/or out to other non-grouped elements are allowed. The level of detail grouping maintains the connectivity (and possibly also the spatial) relationship of the grouped elements with other (outside) elements. In some embodiments, a software/hardware tool providing such level of detail grouping gives the user the ability to control at a higher level of granularity the visual representation of the model the user is working with. The tools and techniques discussed can apply to a variety of model diagram types, UML and otherwise.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Element" is used herein as a technical term, as opposed to its use as a term of art in patent law, unless clearly indicated otherwise. Examples of elements thus include visualized modeling relationship elements such as a UML class, object, interface, use case, component, or node.

Throughout this document, use of the optional plural "(s)" means that one or more of the indicated feature is present. For example, "connector(s)" means "one or more connectors" or equivalently "at least one connector".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using display(s), keyboard(s), a mouse, tablet(s), microphone(s), speaker(s), motion sensor(s), and/or other peripherals 106. System administrators, system architects, designers, developers, engineers, project managers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in-place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as products, product characteristics, inventories, physical measurements, settings, images, readings, targets, volumes, and so forth. Such data is also transformed by as discussed herein, e.g., by connection, association, execution, modification, display, creation, loading, and/or other operations.

Memories 112 may be of different physical types. A visualized modeling language tool 120; diagrams 122 created, accessed, and modified through the tool 120; other software 124; and other items shown in the Figures may reside partially or entirely within one or more memories 112, thereby configuring those memories. An operating environment may also include a display 126, and other hardware 128 such as buses, power supplies, and accelerators, for instance.

The design diagrams 122 may include elements 130 which have associated element type(s) 132, and connector(s) 134 linking the elements 130. Connectors are sometimes called links. Each connector 134 has an associated relationship type 136, and each connector may have one or more associated properties 138. For convenience, properties 138 may be considered part of a relationship and/or part of a relationship's type. The available element type(s) 132 and relationship type(s) 136 are specified in a visualized modeling language specification 140, which can be embodied in the behavior of the tool 120 and/or set forth expressly by documentation in a human-readable file, for instance. The elements 130 may be part of a Unified Modeling Language model diagram, for example.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use visualized modeling language(s).

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
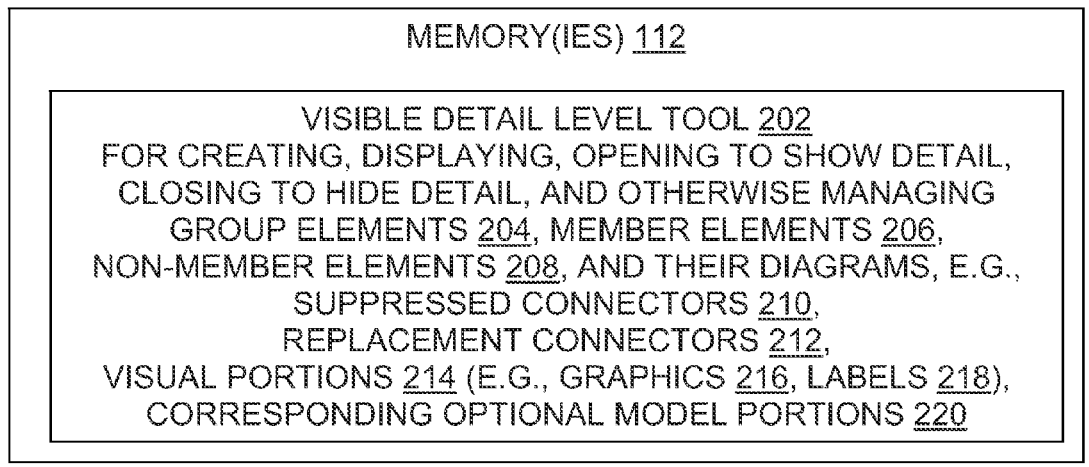
FIG. 2 is a block diagram further illustrating a computer system according to some embodiments, and steps of some method and configured storage medium embodiments.

With reference to FIGS. 1 and 2, some embodiments provide a computer system 102 with a logical processor 110 and a memory 112 configured by circuitry, firmware, and/or software to transform a diagram as described herein. For example, a tool 202 provides an Application Program Interface (API), graphical user interface, and/or other interface for managing detail levels (a.k.a., abstraction levels) in a diagram. Using the tool 202, a user can alter the details visible in a diagram 122 while preserving the diagram's integrity, in the sense that connected elements remain connected either directly or via enveloping group elements. Grouping does not destroy user-supplied connectivity data; ungrouping re-displays the same connections shown prior to grouping.

In some embodiments, the tool 202 makes it possible for a set of visual elements 130 to be treated as member elements 206 which are collectively represented by a smaller set of one or more group elements 204 while maintaining relational and spatial integrity at the boundaries of this abstraction. Member elements may themselves be group elements, allowing multi-level grouping. The group can be localized instead of having to apply the same grouping level to all elements 130 of a diagram 122. Consequently, visual elements can be at different levels of visible detail.

Elements grouped to form a level of detail association need not form a complete closure within themselves; visual connectors moving in and/or out to other non-grouped elements (a.k.a. non-member elements 208) are allowed. The original connectors in and/or out of the group become suppressed connectors 210 but are not deleted; they are re-displayed when the elements hidden in the group are re-displayed. Replacement connectors 212 take the place of the suppressed connectors while the group member elements 206 are hidden in the group (that is, while they are represented by the group element(s) 204). The level of detail grouping may maintain the spatial relationship of the grouped elements with non-member elements, or the diagram may be adjusted to provide uniform spacing between non-member elements and the group element(s).

Each element 130, 204, 206, 208 has a visual portion 214. In particular, group elements 204 have visual portions which may indicate the existence or even some details about the group, such as graphics 216 and/or textual labels 218 that signal the presence of a group to human users 104. In addition to a visual portion, an element may also have a model portion 220, which carries semantic meaning without necessarily being visual. For example, an element might have a model portion containing data that identifies the role played by the element, pursuant to a visualized modeling language specification.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storageretrieval and/or transmission approaches, or an embodiment in a computer system may operate without communicating with other computer systems.

Some embodiments include a computer system 102 having a logical processor 110 and a memory 112 in operable communication with the logical processor. A visualized modeling language diagram 122 configures the memory. The diagram 122 is enhanced to include at least one group element 204 having a displayed visual portion 214, and at least two group member elements 206, each having a non-displayed visual portion 214. Group member elements 206 may also have model portions 220. A non-member element 208, which is neither the group element nor a group member element, also has a displayed visual portion and may have a model portion. A displayed replacement connector 212 connects the group element 204 and the non-member element 208; a corresponding non-displayed suppressed connector 210 connects one of the group's member elements 206 and the non-member element 208.

In some embodiments, a second group element has the aforementioned group element as a second group member element. That is, one may form a multi-level grouping, with two or more nested levels of grouping.

In some embodiments, the group element's visual portion 214 depicts at least one of the following, to signal human users that a group is present at the group element's location in the diagram: a stack, a group member element graphic 216 with thickened lines, a group member element graphic 216 with altered coloring, an icon dedicated to indicating groups. In some embodiments, the displayed group element visual portion includes a textual label 218 including a grouping term, namely, at least one of the terms "group", "collection", "set", "bag", "box", "container". The label 218 could also, or alternately, show the number of elements that have been grouped.

Methods

Figure 3:
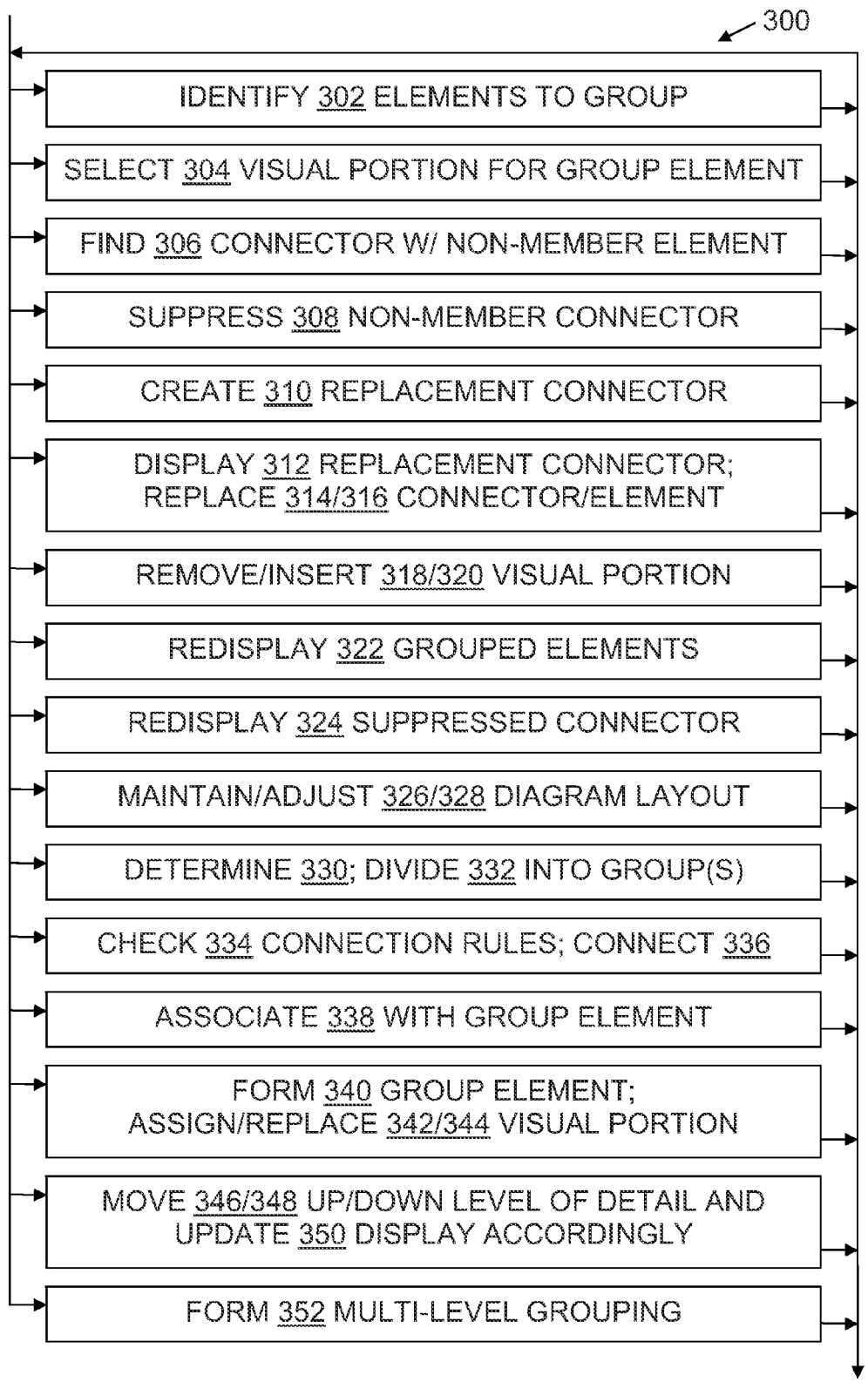
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by a visible detail level tool 202 which extends or modifies a visualized modeling language tool 120 to manipulate elements 130 and group elements 204 and detail levels in a diagram under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During an identifying step 302, an embodiment identifies (and/or receives an identification of) group member elements 206, namely, multiple elements of a diagram which are to be associated with a group element 204. For instance, a user may select elements by user interface gestures such as gestures using a menu, using "+" and "−", or using keyboard shortcuts; selected elements are then identified 302 using handles, GUIDs, or other object identifiers, for example. Elements may also be identified 302 after being selected automatically, e.g., by automatically identifying through graph traversal and type comparison a cluster of adjoining nodes of a single type, as in the example shown in FIG. 5.

During a group element visual portion selecting step 304, an embodiment selects (and/or receives a selection of) a visual portion 214 for a group element. For example, the group element visual portion may be identical with the visual portion of one of the group member elements, or may be based on the visual portion of one of the group member elements with a graphic 216 or label 218) to indicate a group as opposed to a single element.

During a finding step 306, an embodiment finds a connector between a member element 206 and a non-member element 208. Step 306 may include traversing a list of connectors into and/or out of the member elements to see whether the connectors lie entirely within the group, for example.

During a connector suppressing step 308, an embodiment suppresses a connector between a group member element 206 and a non-member element 208 of the diagram. Step 308 may include marking a flag in a data structure that represents a connector, for example.

During a replacement connector creating step 310, an embodiment creates a replacement connector 212 corresponding to a suppressed connector. The replacement connector 212 may include a handle, GUID, or other identification of the suppressed connector. The replacement connector connects the group element with a non-member element, whereas the suppressed connector connects a member of the group with the non-member element.

During a replacement connector displaying step 312, an embodiment displays a replacement connector 212 on a display 126.

During a connector replacing step 314, an embodiment replaces a (suppressed) connector to/from a group member element with a (replacement) connector to/from a group element which represents that group member element. Accordingly, the replacement connector is displayed in place of the suppressed connector, and a connectivity list or other reliance on connectivity will show the connector as being connected to the group element rather than the group's member element.

During an element replacing step 316, an embodiment replaces a (suppressed) group member element 206 with a (replacement) group element 204 which represents that group member element. Accordingly, the group element's visual portion is displayed in place of the group member element's visual portion, and a connectivity list or other reliance on connectivity will show the group element as present in the diagram at the location previously occupied by the group's member element.

During a removing step 318, an embodiment removes a visual portion from a display. Step 318 may occur during connector replacing step 314 and during element replacing step 316, for example.

During an inserting step 320, an embodiment inserts a visual portion on a display. Step 320 may occur during connector replacing step 314 and during element replacing step 316, for example.

During a grouped elements redisplaying step 322, an embodiment again displays visual portions of previously suppressed group member elements, after a user moves visually down into a greater level of detail to display the group member elements associated with a group element. As noted, group member elements 206 are suppressed, not destroyed, when their visual portions are replaced by the visual portion(s) of associated group element(s).

During a connector redisplaying step 324, an embodiment again displays previously suppressed connectors, after a user moves visually down into a greater level of detail to display connectors to/from group member elements associated with a group element 204. Connectors between group member elements and non-member elements are merely suppressed, not destroyed, when the group member element visual portions are replaced by the visual portion(s) of associated group element(s).

During a maintaining step 326, an embodiment substantially maintains the spatial relationship of elements in a display. Step 326 may be accomplished by leaving non-member elements in their respective same absolute (pixel coordinates) screen or window locations after the replacing steps 314, 316 as the non-member elements were in before those replacing steps, for example, or by at least leaving the non-member elements in their same locations relative to one another.

During an adjusting step 328 as a result of grouping, an embodiment automatically adjusts the layout of the model's diagram such that spacing between elements is uniform, e.g., to reduce or even minimize white space between elements once grouping has occurred.

During a determining step 330 acting on N prospective group member elements, an embodiment determines that only a proper subset of the N prospective group member elements can be grouped consistent with connection rules of a visualized modeling language specification. For example, an embodiment may determine that connectors to/from non-member elements are not all compatible with any single type 132 of group element 204, and hence that some of the N prospects must be omitted from grouping and/or some of the N prospects must be associated with different group element(s) than other of the N prospects. In one scenario, N elements have been selected for grouping but not all N elements can be grouped. Instead, one embodiment groups N−1 (if that is possible) and leaves one of the selected elements outside the group.

During a dividing step 332, an embodiment divides N prospective group member elements between at least two group elements, such that multiple elements are associated with each of the group elements.

During a checking step 334, an embodiment checks element type(s) and/or connector type(s) for compliance with connection rules of a visualized modeling language specification 140. Step 334 may occur, for example, with or as part of determining step 330.

During a connecting step 336, an embodiment connects a group element to non-member element(s) consistent with connection rules of a visualized modeling language specification that limit which visual portions can be connected. Step 336 may occur, for example, with or as part of connector replacing step 314 and/or element replacing step 316.

During an associating step 338, an embodiment associates group member elements 206 with a group element 204.

During a group element forming step 340, an embodiment forms a group element, which may include, for example, group element visual portion selecting step 304, allocating memory 112, and populating a group element data structure with values specifying the visual portion 214 and the presently associated group member elements, if any.

During an assigning step 342, an embodiment assigns a visual portion 214 to a group element, e.g., by placing a link, enumeration, or other visual portion identifier value in a group element data structure. The group element does not necessarily have a visual portion prior to step 342.

During a visual portion replacing step 344, an embodiment replaces a visual portion 214 of a group element, e.g., by replacing a link, enumeration, or other existing visual portion identifier value in a group element data structure with a value identifying a different visual portion.

During a moving up step 346, an embodiment moves up to a less detailed view, e.g., by performing some or all of steps 304 through 320. In software developer terms, the localized level of abstraction is made higher, so less detail is shown in the diagram. This process of grouping can be applied to multiple parts of the (visual) model; group elements are localized.

During a moving down step 348, an embodiment moves down to a more detailed view, e.g., by performing some or all of 306, 322, 324. In software developer terms, the localized level of abstraction is made lower, so more detail is shown in the diagram. Ungrouping elements by moving down restores the elements to their original state.

During an updating step 350, an embodiment updates a display to show group element visual portions/group member element visual portions, replacement connectors/suppressed connectors, for example, in conjunction with or as part of moving up step 346/moving down step 348. The integrity of incoming and outgoing connections to the group is maintained relative to the rest of the model.

During a multi-level grouping forming step 352, an embodiment moves up 346, with one of the group member elements itself being a group element.

Some embodiments provide a method utilizing multi-level group representations in a visualized modeling language diagram which contains elements. Each element has a visual portion (aka presentation portion) and optionally also has a model portion (aka data portion/implementation detail portion). The method includes identifying multiple elements to be associated with a group element, e.g., by user selection of the multiple elements (aka associated elements/grouped elements). The method also includes selecting a visual portion for the group element. The method also includes suppressing each connector between one or more of the identified elements and non-member outside element(s), that is, elements of the diagram which are neither an identified element nor the group element. The method also includes creating a replacement connector for each suppressed connector, the replacement connector connecting the outside element(s) and the group element whereas the suppressed connector connected the outside element and the identified element(s). The method also includes replacing visual portions of the identified elements with the visual portion of the group element in a display, and replacing the suppressed connector(s) with respective replacement connector(s).

In some embodiments, each visual portion includes a graphic 216 and a label 218, and the selecting step selects for the group element a visual portion 214 having a graphic which is the same as the graphic of one of the identified elements.

In some embodiments, each visual portion includes a graphic and a label, and the selecting step selects for the group element a visual portion having a graphic which is similar to the graphic of one of the identified elements, e.g., a graphic 216 depicting at least one of the following: a stack of identified element graphics, a pile of identified element graphics, a bag or box or other container of identified element graphics, an identified element graphic with thickened lines, an identified element graphic with different coloring (darker color may indicate additional levels, with no color/neutral color indicating no group levels), an identified element graphic with a glyph or icon dedicated for indicated groups.

In some embodiments, each visual portion includes a graphic 216 and a label 218, and the selecting step selects for the group element a visual portion having a label which is different from the label of any of the associated elements, e.g., a label which overlaps label(s) of the associated elements and also indicates grouping by including a term such as "group", "collection", "set", "bag", "box", "container", etc.

In some embodiments, the method also includes displaying a connector between an associated element visual portion and a non-associated (aka outside) element visual portion prior to the replacing step, and includes displaying that connector's replacement between the group element visual portion and the non-associated element visual portion after the replacing steps.

In some embodiments, the method also includes replacing, in the display, the visual portion assigned to the group element with the visual portions of the associated elements, and replacing the replacement connectors with their respective suppressed connectors. That is, the method includes undoing the grouping to again show the individual elements that were grouped, allowing a user to go down a level to get details.

In some embodiments, the method also includes creating a nested group (aka multi-level grouping) with the group element 204 being a first group element, and the method including creating a second group element. The first group element and at least one other element are associated with the second group element. A visual portion is assigned to the second group element, and visual portions of the associated elements are replaced in the display with the visual portion assigned to the second group element. The method may also suppress connectors and create and display replacement connectors.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as those shown in FIG. 2, in the form of data 118 and instructions 116, read from a removable medium 114 and/or another source such as a network connection, to form a configured medium. The configured memory 112 is capable of causing a computer system to perform method steps for transforming data through localized multi-level displayed detail control and grouping as disclosed herein. FIGS. 1 through 3 thus help illustrate configured storage media embodiments and method embodiments, as well as system and method embodiments. In particular, any of the method steps illustrated in FIG. 2 or 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Some embodiments may be suitable for inclusion in a product offering such as the Microsoft® Visual Studio® Team System Architecture 2010 product.

Figure 4:
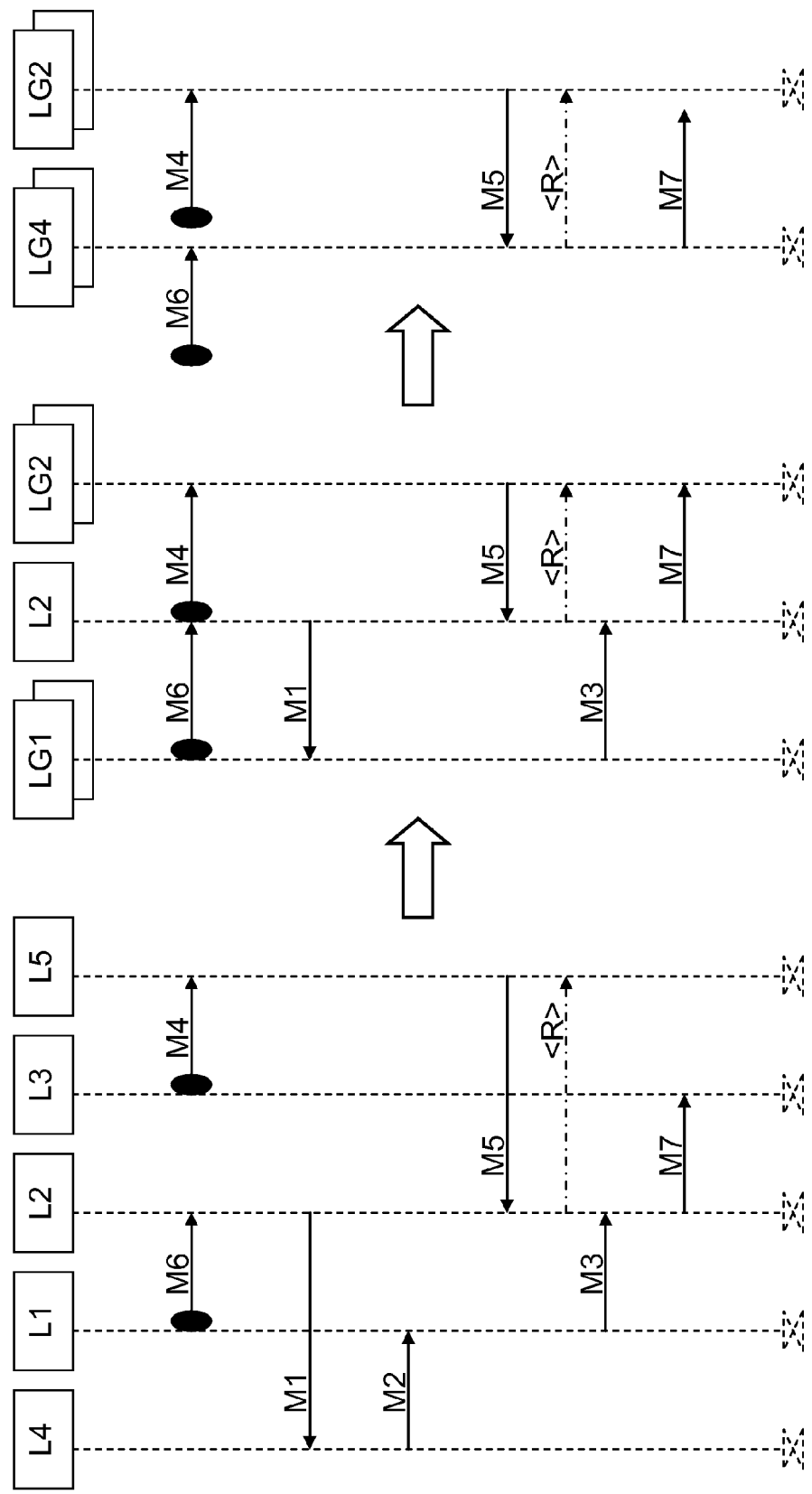
FIG. 4 is a screen shot showing an example of multi-level localized detail grouping in a sequence designer implementation.

FIG. 4 shows an example of multi-level localized detail grouping (aka abstraction) in a sequence designer implementation. The illustration shows three phases. An initial (leftmost) phase is transformed to a middle phase, which is then transformed to a third (rightmost) phase. As part of the transformation from the initial phase to the middle phase, L4 and L1 are collapsed (grouped) into a group element LG1, and L3 and L5 are collapsed into LG2. The middle phase transformation to the third phase provides a second level of abstraction (multi-level grouping), with LG1 and L2 abstracted into LG4.

One of the features illustrated in FIG. 4 is use of a group element visual portion 214 depicting a stack, e.g., LG1 (LifelineGroup1) has a graphic shadow to the right and below. Another feature shown is the use of a group element label 218 ("LG1" for LifelineGroup1) which overlaps a label of an associated group member element label (both contain "L" for "Lifeline") while also indicating presence of a grouping ("G" for "Group"). Another feature shown is the display of replacement connectors, e.g., M1 for Message1, M3 for Message3 connectors in the middle phase after L4 (Lifeline4) and L1 (Lifeline1) are collapsed—grouped—into LG1 (LifelineGroup1).

Figure 5:
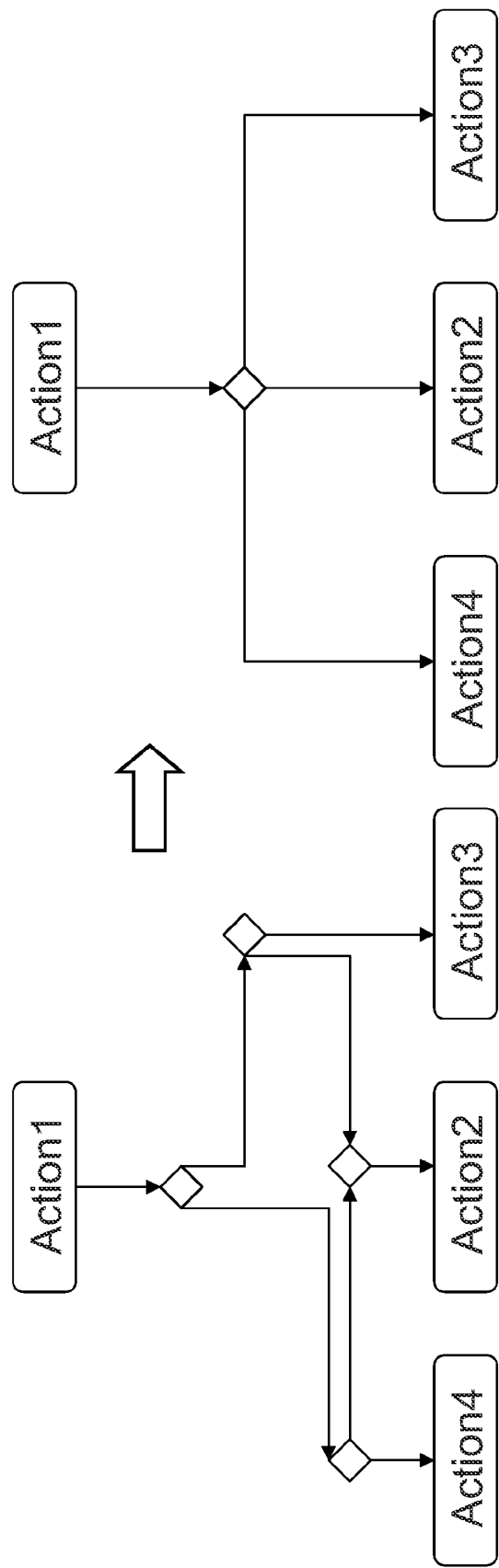
FIG. 5 is a screen shot mock-up showing an example of multi-level localized detail grouping in a component designer.

FIG. 5 shows a mock-up example of multi-level localized detail grouping (aka abstraction) in a component designer. Decision nodes and a merge node are abstracted into one decision node. Nodes correspond with elements. One feature illustrated is the use of a visual portion for the group element that is identical to the visual portion of one or more grouped elements (actually, identical to all grouped element visual portions, in this particular example).

Figure 6:
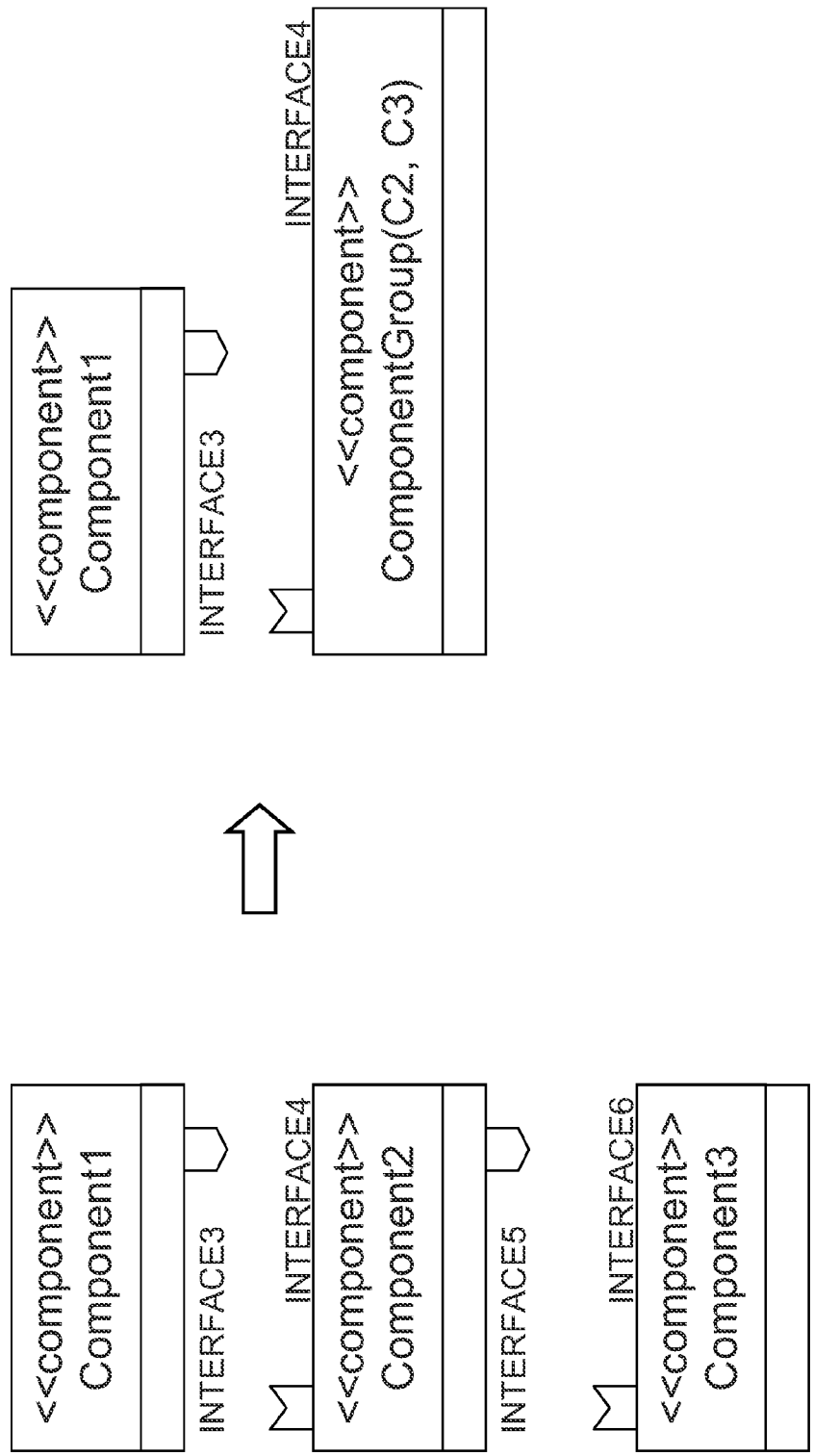
FIG. 6 is a screen shot showing an example of multi-level localized detail grouping in an activity designer.

FIG. 6 shows a mock-up example of multi-level localized detail grouping (aka abstraction) in an activity designer. A Component2 element and a Component3 element 130 are abstracted into a ComponentGroup group element. One feature illustrated is the use of a visual portion for the group element 204 that is identical to the visual portion of one or more grouped elements, with however a different label, namely, a "Group" suffix ("ComponentGroup" as opposed to "Component").

Figure 7:
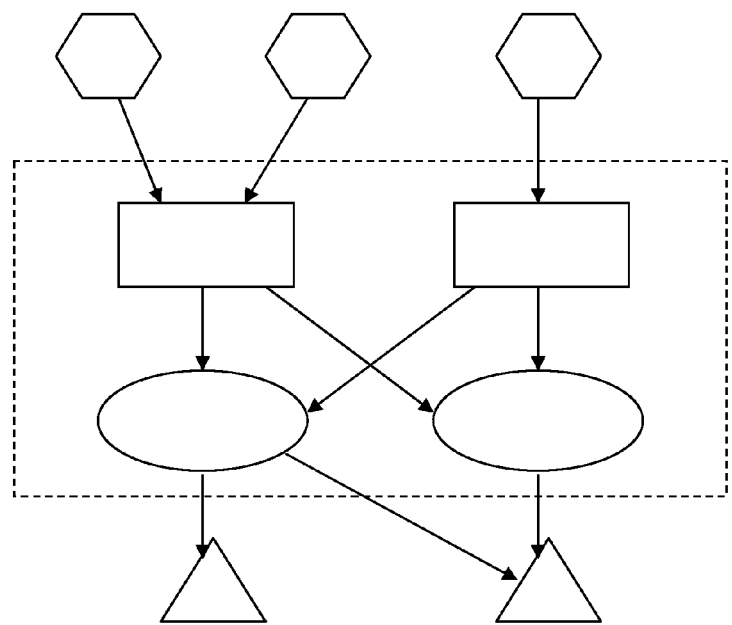
FIGS. 7 and 8 are element diagram depictions before and after, respectively, a set of several identified elements is grouped for representation by two group elements consistent with connection rules.
Figure 8:
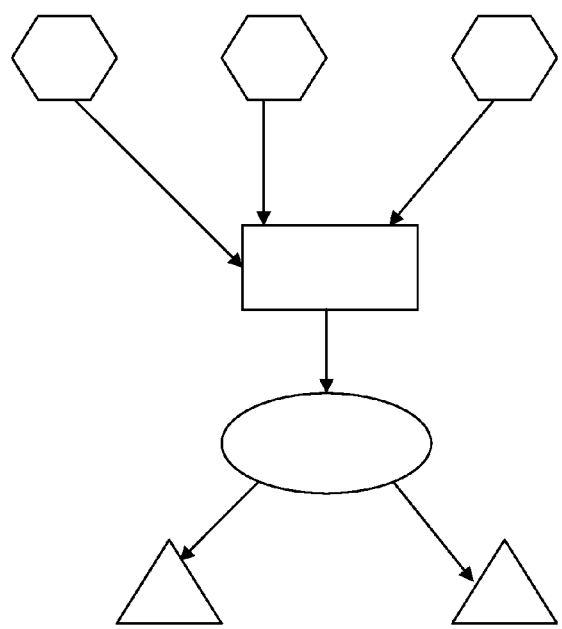

FIGS. 7 and 8 are element diagram depictions before and after, respectively, a set of several identified elements is grouped for representation by two group elements 204 consistent with connection rules. In the illustrated scenario four shapes (aka elements 130) are selected by a user, namely, the two rectangles and two ovals. In FIG. 7, selection is indicated by enclosure in a dashed line, but other selections user interface mechanisms (highlighting, color change, etc.) could also be used. The user wants to collapse the selected elements into a localized level of detail. Assume that the modeling diagram in question has connection constraints (aka connection rules) under an interpretation of a specification 140 of a modeling language, including a constraint prohibiting a direct connector from a rectangle to a triangle, and a constraint prohibiting a direct connector from a hexagon to an oval. In this scenario, an embodiment accordingly creates two model group elements 204 rather than one, for the desired detail level, leading to the result shown in FIG. 8. The two rectangle elements 130 of FIG. 7 are abstracted into one rectangle group element 204 in FIG. 8, and the two oval elements 130 of FIG. 7 are abstracted into one oval group element 204 in FIG. 8.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are also part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method facilitating grouping in a visualized modeling language diagram which contains elements, the method comprising the steps of:
    a processor identifying group member elements, namely, identifying multiple elements of the diagram to be associated with a group element, each group member element having a respective visual portion;
    selecting a visual portion for the group element;
    connecting at least two group elements to non-member elements in a manner consistent with connection rules of a visualized modeling language specification that limit which visual portions can be connected, thereby avoiding connecting group elements to non-member elements in a manner prohibited by the connection rules, each non-member element being neither the group element nor a croup member element, each non-member element having a displayed visual portion and a model portion;
    suppressing a connector between a group member element and a non-member element of the diagram, the non-member element being neither the group element nor a group member element;
    creating a replacement connector for the suppressed connector, the replacement connector connecting the group element and the non-member element;
    removing visual portions of the group member elements from a display;
    inserting the visual portion of the group element in the display in place of the removed group member elements' visual portions; and
    replacing the suppressed connector with the replacement connector.

2. The method of claim 1, wherein each visual portion includes a visible graphic, and the selecting step selects for the group element a visual portion having a graphic which is the same as the graphic of one of the group member elements.

3. The method of claim 1, wherein the selecting step selects for the group element a visual portion having a graphic which is similar to the graphic of one of the group member elements, namely, a graphic depicting at least one of the following:
    a stack of group member element graphics,
    a pile of group member element graphics,
    a container of group member element graphics.

4. The method of claim 1, wherein the selecting step selects for the group element a visual portion having a graphic which is similar to the graphic of one of the group member elements, namely, a graphic depicting at least one of the following:
    a group member element graphic with thickened lines,
    a group member element graphic with altered coloring,
    a group member element graphic with an icon dedicated to indicating groups.

5. The method of claim 1, wherein the method comprises suppressing multiple connectors between group member element(s) and non-member element(s) of the diagram, and creating multiple corresponding replacement connectors.

6. The method of claim 1, wherein the method maintains non-member elements in their respective displayed locations.

7. The method of claim 1, further comprising adjusting the diagram to show uniform spacing between displayed element visual portions after inserting the visual portion of the group element.

8. The method of claim 1, wherein the method comprises:
    identifying at least five group member elements which collectively have at least two visibly different visual portions; and
    dividing the group member elements between at least two group elements, such that multiple elements are associated with each of the group elements; and
    connecting the group elements to non-member elements consistent with connection rules of a visualized modeling language specification that limit which visual portions can be connected.

9. The method of claim 1, wherein the method comprises:
    Identifying at least N prospective group member elements, wherein N is an integer greater than 1;
    determining that only a proper subset of the at least N prospective group member elements can be grouped consistent with connection rules of a visualized modeling language specification; and associating the proper subset with a group element and omitting at least one of the N prospective group member elements from association with the group element.

10. The method of claim 1, wherein the group element is a first group element, and the method further comprises:
forming a second group element;
associating the first group element and at least one other element of the diagram with the second group element as second group member elements;
assigning a visual portion to the second group element; and
in the display, replacing visual portions of the second group member elements with the visual portion assigned to the second group element.

11. A computer-readable memory device configured with data and instructions for performing a method facilitating multi-level grouping in a visualized modeling language diagram which contains elements, the method comprising the steps of:
a processor identifying user-selected first group member elements, namely, identifying multiple elements of the diagram selected by a human user to be associated with a first group element, each first group member element having a respective visual portion;
selecting a visual portion for the first group element;
removing visual portions of the first group member elements from a display;
inserting the visual portion of the first group element in the display in place of the removed first group member elements' visual portions;
forming a second group element;
associating the first group element and at least one other element of the diagram with the second group element as second group member elements;
assigning a visual portion to the second group element;
in the display, replacing visual portions of the second group member elements with the visual portion assigned to the second group element; and
connecting at least one of the group elements to non-member elements consistent with connection rules of a visualized modeling language specification that limit which visual portions can be connected, thereby avoiding connecting group elements to non-member elements in a manner prohibited by the connection rules, each non-member element being neither a croup element nor a croup member element, each non-member element having a displayed visual portion and a model portion.

12. The configured memory device of claim 11, wherein the method further comprises:
suppressing a connector between a group member element and a non-member element of the diagram;
creating a replacement connector for the suppressed connector; and
replacing the suppressed connector with the replacement connector.

13. The configured memory device of claim 11, wherein the method further comprises replacing, in the display, the visual portion assigned to the second group element with the visual portions of the second group elements.

14. The configured memory device of claim 11, wherein each visual portion includes a visible graphic, and the selecting step selects for the first group element a visual portion having a graphic which is the same as the graphic of one of the first group member elements.

15. The configured memory device of claim 11, wherein the selecting step selects for the first group element a visual portion having a graphic depicting at least one of the following:
a stack of first group member element graphics,
a pile of first group member element graphics,
a container of first group member element graphics,
a first group member element graphic with thickened lines,
a first group member element graphic with altered coloring,
a first group member element graphic with an icon dedicated to indicating groups,
a count of the number of group member elements.

16. The configured memory device of claim 11, wherein the method maintains non-member elements in their displayed locations relative to each other before and after inserting the visual portion of the first group element in the display in place of the removed first group member elements' visual portions.

17. A computer system comprising:
a logical processor;
a memory in operable communication with the logical processor; and
a visualized modeling language diagram configuring the memory and including:
a group element having a displayed visual portion;
at least two group member elements, each having a model portion and a non-displayed visual portion;
at least two group elements which are connected to non-member elements consistent with connection rules of a visualized modeling language specification that limit which visual portions can be connected, the diagram being free of group element connections to non-member elements which are prohibited by the connection rules;
a non-member element which is neither the group element nor a group member element, the non-member element having a displayed visual portion and a model portion;
a displayed replacement connector connecting the group element and the non-member element; and
a non-displayed suppressed connector connecting one of the group member elements and the non-member element.

18. The system of claim 17, further comprising a second group element which has the group element as a second group member element, thereby forming a multi-level grouping.

19. The system of claim 17, wherein the group element visual portion depicts at least one of the following:
a stack,
a group member element graphic with thickened lines,
a group member element graphic with altered coloring,
an icon dedicated to indicating groups.

20. The system of claim 17, wherein the displayed group element visual portion comprises a textual label including a grouping term, namely, at least one of the terms "group", "collection", "set", "bag", "box", "container".

* * * * *